Figure 1:
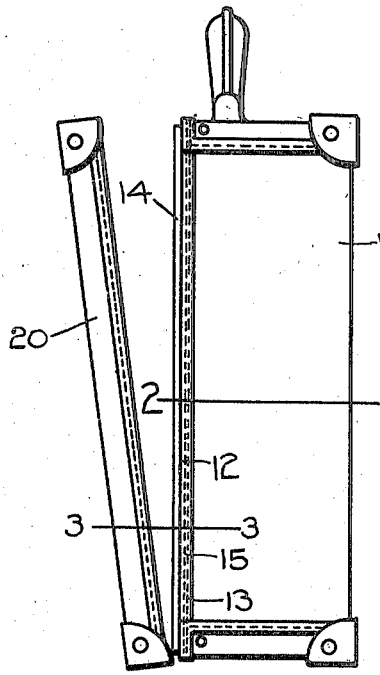

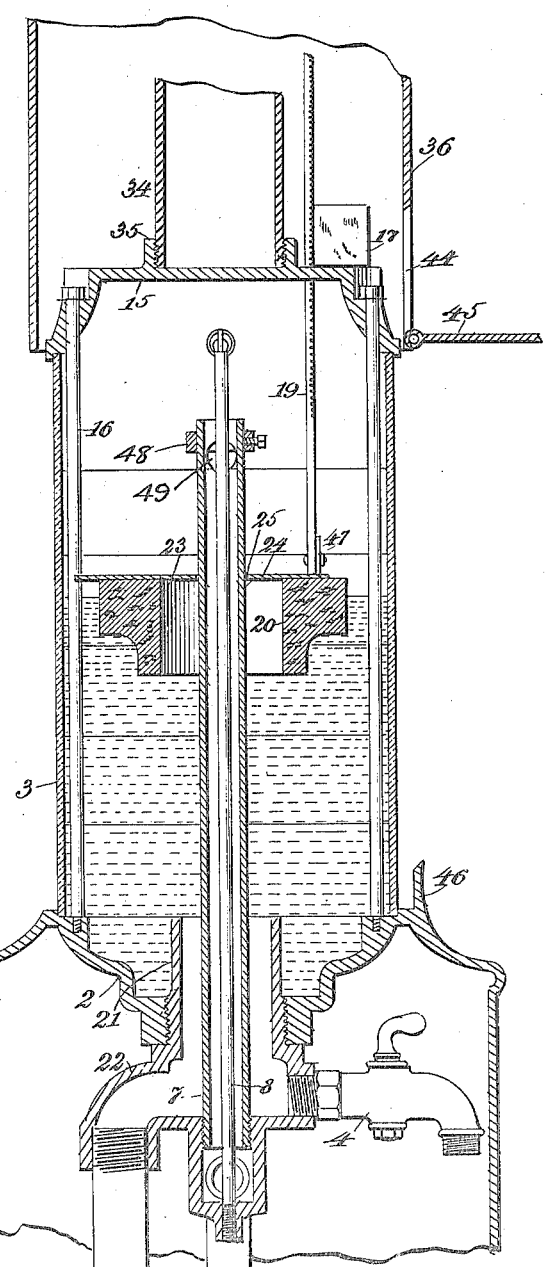
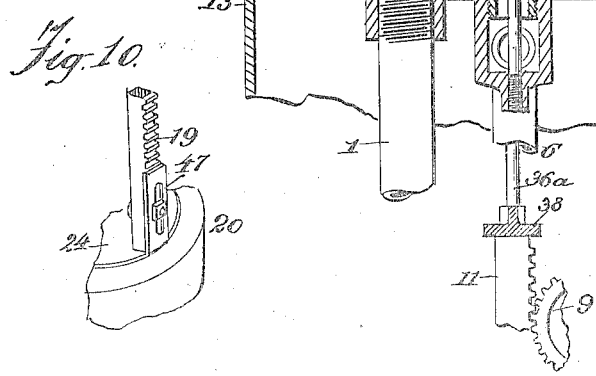

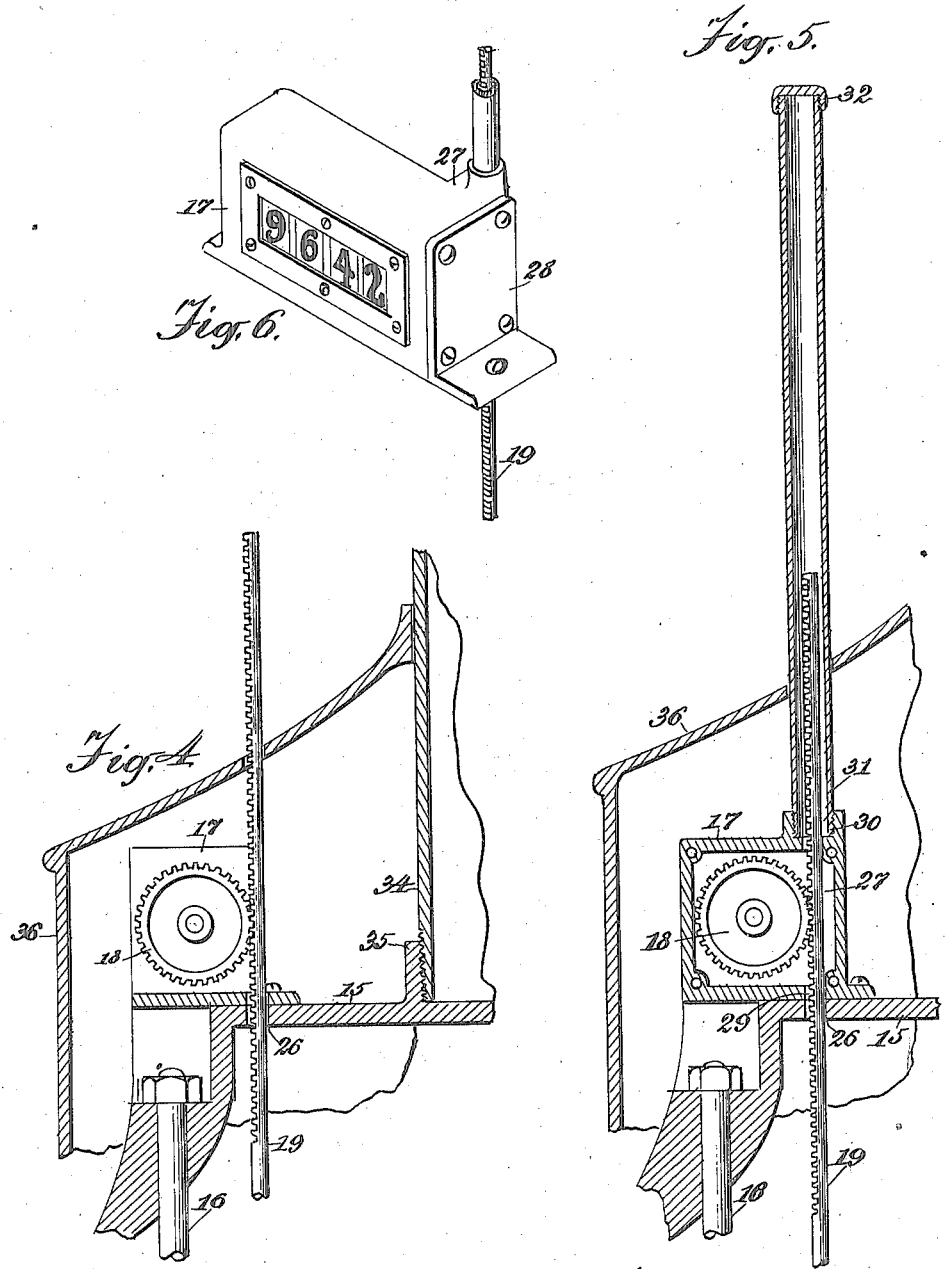

W. H. DUTTON AND C. E. STONE.
LIQUID MEASURING AND DISPENSING APPARATUS.
APPLICATION FILED OCT. 25, 1917.
1,393,272.
Patented Oct. 11, 1921.
4 SHEETS—SHEET 4.
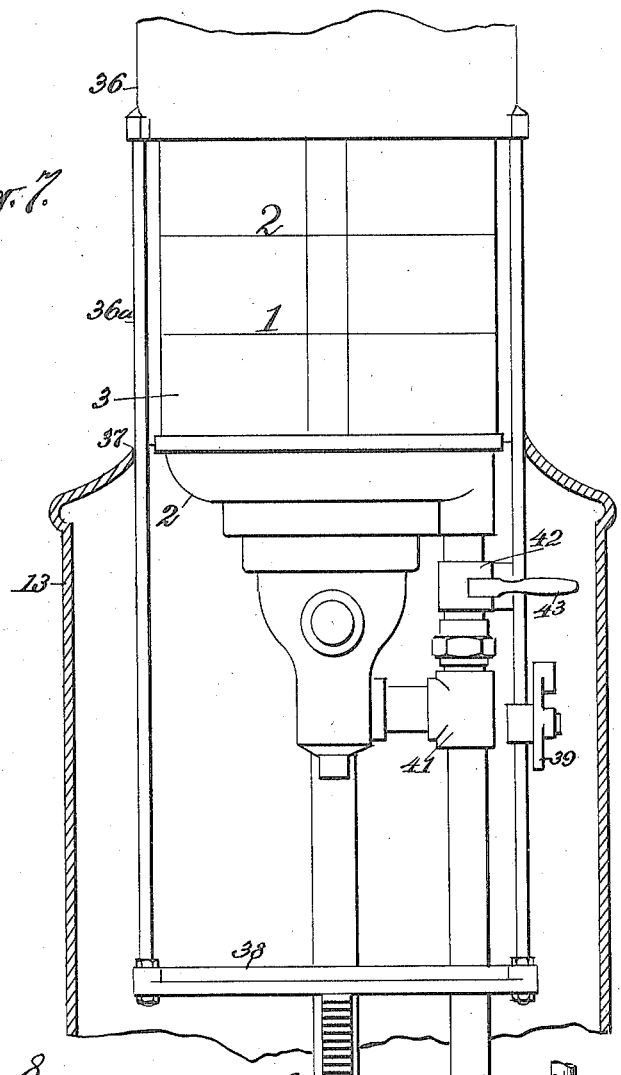
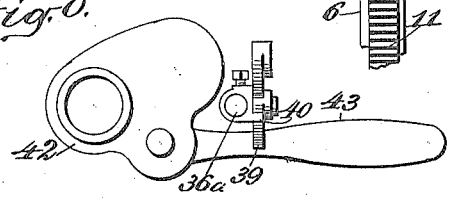
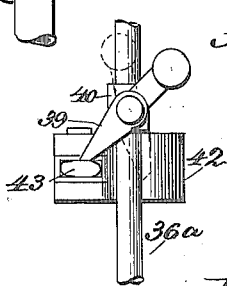

UNITED STATES PATENT OFFICE.

WILLIAM H. DUTTON AND CLAYTON E. STONE, OF CEDAR RAPIDS, IOWA, ASSIGNORS TO THE TOKHEIM OIL TANK AND PUMP COMPANY, A CORPORATION OF INDIANA.

LIQUID MEASURING AND DISPENSING APPARATUS.

1,393,272.   Specification of Letters Patent.   Patented Oct. 11, 1921.

Application filed October 25, 1917. Serial No. 198,493.

*To all whom it may concern:*

Be it known that we, WILLIAM H. DUTTON and CLAYTON E. STONE, citizens of the United States, residing at Cedar Rapids, in the county of Linn and State of Iowa, have invented certain new and useful Improvements in Liquid Measuring and Dispensing Apparatus; and we do hereby declare the following to be a full, clear, and exact description of the invention, such as will enable others skilled in the art to which it appertains to make and use the same.

This invention relates to the drawing and measuring of liquids, and more particularly of gasolene at street service stations for the use of automobiles and other motor vehicles.

One of the principal objects of the invention is to provide such service apparatus with a receiver for the gasolene as drawn which is of transparent material, such as glass, and is graduated and marked so that the purchaser may know by observation that he is receiving full measure.

Another object is to protect such glass receiver from accidental or malicious injury by incasing it when not in active use, or in the intervals of such use, as will hereafter more fully appear.

Another object is to protect the dispenser of such liquid against fraud and dishonesty on the part of an employee, and to secure an accurate and continuous record of the output of the station by means of automatic registering apparatus.

Other and subsidiary objects will appear in the description of the invention which follows, reference being had to the accompanying drawings, in which:—

Figure 2:
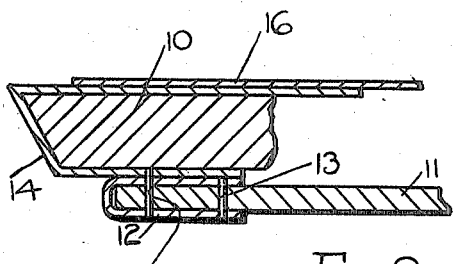
Figure 3:
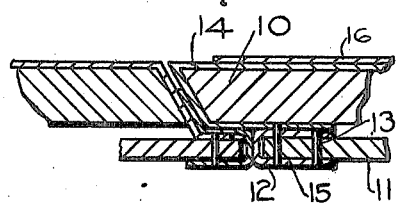
Figure 4:
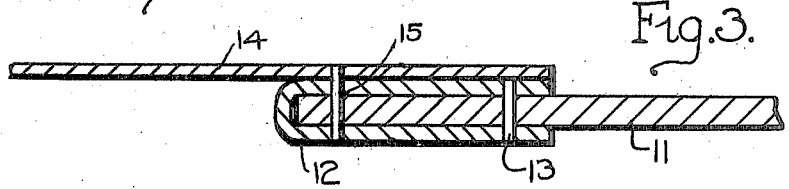

Figure 1 is a side view of apparatus embodying our invention as it appears when closed and not in use. Fig. 2 is a front view of the same open and ready for use. Fig. 3 is a vertical central section, illustrating the glass receiver, its supporting hollow column, its inclosing hood, and other parts that will be more particularly noted hereafter. Fig. 4 is a section in a plane central to the float-rod illustrating the connection of the float-rod with a counter, and the relation of fragmentary parts adjacent thereto, the rod in this case passing through a hole in the top of the hood, and out to the open air. Fig. 5 is of similar nature, but shows means for entirely inclosing the counting apparatus against leakage. Fig. 6 is a view in perspective illustrating the type of counter and connecting apparatus shown in Fig. 5. Fig. 7 is a fragmentary side view, the main column being in section, showing details of the piping, and more particularly, of the apparatus for raising and supporting the receiver-covering hood. Fig. 8 is a plan view of a quick-opening valve and a connection of the hood-support therewith. Fig. 9 is a side view of the same as seen from the right. Fig. 10 shows means for adjusting the rack-rod of the float.

The invention embraces in a general way the application to street pumping service of the type of liquid measuring pump shown in the patent to John J. Tokheim, No. 720,638, issued February 17, 1903, to which reference may be had for details not herein set forth. Briefly described it comprises a pump (not shown) communicating by a pipe 1 with a storage tank (not shown), and at its upper end with the base 2 of a glass receiver 3. To this base is connected the supply-cock 4, which for street service is provided with a suitable hose 5. The base also connects with an overflow pipe 6, the lower end of which leads back to the supply tank, and the upper section 7 of which extends up into the receiver to the height of its predetermined capacity. Inside this section of the overflow pipe is a small vent-pipe 8 to supply air for the outflow of liquid from the receiver. The receiver is herein shown graduated to hold five gallons, its capacity being such as the conditions of service may require.

In the apparatus as herein shown the receiver base forms the crown of the main column, within which is mounted suitable gearing 9 operated by a hand-crank 10, and engaging a rack 11, which connects with the pump-rod (not shown) in a manner too familiar to require particular description. This column is carried by the base 12, within which the pump cylinder may or may not be mounted, as desired. The column 13 is provided with a door 14, for the safe inclosure of the parts inside.

The measure indicating and registering apparatus is best shown in Fig. 3. Between cumstances it would be preferable to lift the hood and allow it to remain elevated throughout the day, or for a shorter period. This convenience is secured by providing some part of the hood, preferably one of the parallel rods, with a catch 39 adapted to engage some supporting part, and thus hold the hood up until released. The preferred support will be described presently. The catch is shown as a weighted pawl, which in holding position tilts against a shoulder 40, and in disengaged position may be rocked oppositely against the shoulder, as shown by the dotted outline in Fig. 9.

It is desirable to drain the receiver at night, or other times when it is to be left for some time without attendance. Its well is accordingly connected with the waste-pipe as by a T 41 and intermediate fittings. One of these is a valve 42, herein shown as of the "quick-opening" type, with a lever 43. This is so positioned as to swing into the path of the pawl 39 when in valve-closing position. When elevated, therefore, the hood is carried by this lever. This serves as a check against dropping the hood until the valve is first opened and the receiver drained of its contents.

In order to avoid excessive raising of the hood, to expose the counter, the former is shown provided with an opening 44 near the bottom and in front, with a flap door 45 fitted therein to swing down and open, as shown in Fig. 3. When the hood is depressed a fixed finger 46 engages the flap and closes it, holding it in such closed position.

In Fig. 10 is shown a simple device for adjusting the rack-rod of the float. In practice it is found to be impossible to produce glass cylinders of exactly uniform diameter. It is therefore necessary to graduate each cylinder separately, the graduation of course varying according to such diameter. It is essential that the counter be actuated in accordance with the amount of liquid discharged from the receiver, and to effect an accurate correspondence of movement between the counter and float at the proper stages, especially at the extremities of the movement of the latter, means of adjustment between the rack-rod and float are provided which consists of the slotted bracket 47 which is attached to the float and to which the rod is bolted. Also the upward movement of the float is limited by an adjustable collar 48 attached to the overflow pipe, against which the float abuts. Thus, the vertical movement of the float when the receiver is filled and emptied is definitely regulated, and by means of the adjustable connection with the rack-rod and float, the counter is made to conform precisely in its function with the movement of the float. The collar 48 is secured to the overflow pipe 7 near the top thereof, and the overflow openings 49 in the sides of the pipe are so located as to receive the overflow at a level beneath the collar.

Having thus described our invention, we claim:

1. In apparatus of the class described, a transparent receiver; a supporting column therefor; charging and discharging means contained within the column, the charging means having a movable part; and a hood having pendant members and adapted to shield the receiver, said members being adapted to contact with the movable part of the charging means whereby the hood becomes elevated as the receiver is charged.

2. In apparatus of the class described, a transparent receiver; a supporting column therefor; charging means within the column having a movable part; a movable hood for shielding the receiver and having pendant guide-rods; and a bridge attached to the lower ends of the rods adapted to be engaged and lifted by the movable part.

3. In apparatus of the class described, a transparent receiver; a supporting column therefor; means for charging the receiver, having a movable part; a movable hood for shielding the receiver and having means in connection therewith adapted to contact with said movable part and to be elevated thereby; and means for discharging the receiver.

4. In apparatus of the class described, a transparent receiver; a supporting column therefor; charging means for the receiver; a movable hood for shielding the receiver; and a mechanism in connection with the charging means for imparting movement to the hood.

5. In apparatus of the class described, a transparent receiver; a supporting column therefor; a charging means for the receiver; a movable hood for shielding the receiver; a mechanism in connection with the charging means for elevating the hood; and a detent device for engaging and holding the hood in open position.

6. In apparatus of the class described, a transparent receiver; a supporting column therefor; a charging means for the receiver; a movable hood having connecting relation with the charging means adapted to be elevated thereby; an independent drain valve for the receiver; a lever for opening and closing the drain valve; and a connection between the charging means and the hood including a catch moving in a path intercepted by the lever when in closed position adapted to prevent closing the hood before the drain valve is opened.

7. In apparatus of the class described, a transparent receiver; a counter mounted thereon; a charging means for the receiver; an independent discharging means therefor;

a movable hood for shielding the receiver having an opening to expose the counter when the hood is elevated; and means for automatically closing the opening when the hood is closed.

8. In dispensing apparatus having a receiver including charging and discharging means and an independent drain valve therefor, a movable hood for shielding the receiver having means for engaging the drain-valve when the hood is open and the valve is closed so that movement of the hood to closed position is dependent upon the valve being first moved to open position.

In testimony whereof we affix our signatures in presence of two witnesses.

WILLIAM H. DUTTON.
CLAYTON E. STONE.

Witnesses:
  GEORGE B. DUTTON,
  J. M. ST. JOHN.

B. ELLIOTT.
SUITCASE.
APPLICATION FILED JAN. 21, 1921.

1,393,273.

Patented Oct. 11, 1921.

INVENTOR
BAMFORD ELLIOTT
BY
ATTORNEYS